US007742205B2

(12) United States Patent
Lor et al.

(10) Patent No.: US 7,742,205 B2

(45) Date of Patent: Jun. 22, 2010

(54) PERCEPTUAL COLOR MATCHING METHOD BETWEEN TWO DIFFERENT POLYCHROMATIC DISPLAYS

(75) Inventors: Wing Keung Felix Lor, Hong Kong (CN); Gia Chuong Phan, Hong Kong (CN)

(73) Assignee: VP Assets Limited Registered in British Virgin Islands, Shatin, N.T., Hong Kong (CN)

(*) Notice: Subject to any disclaimer, the term of this patent is extended or adjusted under 35 U.S.C. 154(b) by 1076 days.

(21) Appl. No.: 11/304,582

(22) Filed: Dec. 16, 2005

(65) Prior Publication Data

US 2007/0139669 A1 Jun. 21, 2007

(51) Int. Cl.
*H04N 1/46* (2006.01)

(52) U.S. Cl. ........................ 358/515; 358/516; 358/517; 358/518

(58) Field of Classification Search ................. 358/515, 358/516, 517, 518, 519
See application file for complete search history.

(56) References Cited

U.S. PATENT DOCUMENTS

| | | | |
|---|---|---|---|
| 5,341,153 A | 8/1994 | Benzschawel et al. | |
| 5,929,843 A | 7/1999 | Tanioka | |
| 6,384,836 B1 | 5/2002 | Naylor, Jr. et al. | |
| 6,453,067 B1 | 9/2002 | Morgan et al. | |
| 6,885,380 B1 | 4/2005 | Primerano et al. | |
| 6,897,876 B2 * | 5/2005 | Murdoch et al. | 345/589 |
| 2003/0034992 A1 | 2/2003 | Elliott et al. | |
| 2004/0114046 A1 | 6/2004 | Lee et al. | |
| 2004/0222999 A1 | 11/2004 | Choi et al. | |
| 2004/0234163 A1 | 11/2004 | Lee et al. | |
| 2005/0040756 A1 | 2/2005 | Winters et al. | |
| 2005/0088385 A1 | 4/2005 | Elliott et al. | |

* cited by examiner

*Primary Examiner*—Houshang Safaipour
(74) *Attorney, Agent, or Firm*—Birch, Stewart, Kolasch & Birch, LLP

(57) ABSTRACT

The invention relates to a color matching method for transforming a color representation of a first set of color primaries with a plurality of first signals to a second set of color primaries with a plurality of second signals in a first domain. The color matching method of the invention is to consider the characteristics of human visual perception. Since human is more sensitive to the luminous intensity than chrominance, the color matching method of the invention is considered to match the luminous intensity. The color matching method of the invention can minimize the intensity difference by utilizing the optimality of resource distribution. An additional step of smoothing the intensity difference among color primaries at the level of color primaries is appended. It enhances the visual quality especially for the images with a gradual change in numerous levels of color. Besides, when the color is outside the gamut, we keep the information of luminance by adding extra white. According to the invention, the color matching method of handling colors outside gamut can provide a higher contrast which is especially good for displaying a color change with numerous levels, such as sunrise or sunset scenes. The color matching method further considers color interactions of each color primary regarding the configuration of surrounding color primaries. With the consideration of exploiting the perceived luminous intensity instead of physical luminous intensity, a superior color matching algorithm can be made.

34 Claims, 10 Drawing Sheets

PERCEPTUAL COLOR MATCHING METHOD BETWEEN TWO DIFFERENT POLYCHROMATIC DISPLAYS

BACKGROUND OF THE INVENTION

1. Field of the Invention

The present invention relates to a color matching method, and in particular, to a perceptual color matching method between two different polychromatic displays.

2. Description of the Related Art

Current display technology employs the characteristics of human vision to regenerate the color, instead of emitting light beams at the exact frequency corresponding to each color. Therefore, a display with different configurations of color primaries, it requires a corresponding color mapping algorithm. The simplest way to generate a color is to use three-color primaries, such as red (R), green (G) and blue (B) on light emitting displays, as shown in FIG. 1.

FIGS. 1 and 2 show a conventional R'G'B'-stripe display and a RGBW pattern display. Recently, there is a lot of research working on color matching from RGB to RGBW screen. The RGBW serene comprises four color primaries, such as red (R), green (G), blue (B) and white (W). However, color images of the RGBW display may be different from those of conventional R'G'B'-stripe display due to different color gamuts. Color matching is essential in order to match the performance.

Referring to FIGS. 1 and 2, we assume the size of both full-pixels to be the same. Even if they use the same power of backlight, both color gamuts will intersect each other, but not exactly overlapped. Thus, a color cannot be converted exactly from one to another unless increasing the range of luminous intensity such that the target color gamut to be a superset of source color gamut. Most of the colors matching algorithms exploit clipping or re-mapping of colors.

In the conventional color matching method, suppose (R', G', B') be the values of the color in the conventional R'G'B'-stripe display and (R, G, B, W) be the corresponding values in RGBW display. The simple way to match it as the equation shown below:

$$R = \frac{4}{3}R',\ G = \frac{4}{3}G',\ B = \frac{4}{3}B',\ W = 0$$

The 4/3 factor is used because it is a ratio of area of sub-pixel between two panels. However, if the value is greater than three quarter of the full strength, the value of the new display will become overflow. Therefore, we must clip the value to make sure the new set of values within the valid range. On the other hand, there is an extra white color dot, which can be decomposed into r, g, b.

$$W = k_r r + k_g g + k_b b,\ k_r + k_g + k_b = 1$$

Where $k_r$, $k_g$, $k_b$ are respectively the coefficients of red, green and blue components of luminance of a color space. For example, (0.299, 0.587, 0.114) is used in NTSC standard. As some portions of R', G', B' will combine to become luminance, the conventional color matching method shifts the common amount in R', G', B', into the color dot W. That is similar to the approach proposed by Morgan et. al.

$$W = \frac{4}{3}\min(R', G', B'),\ R = \frac{4}{3}R' - W,\ G = \frac{4}{3}G' - W,\ B = \frac{4}{3}B' - W$$

Allocating color into the extra white dot can also free up more vacant spaces in R, G, B color primaries for further color enhancement processes. However, if the difference between R', G', B' is large, some of values of R, G, B may still be overflow. Therefore, it requires an additional process to transform the values of colors outside the gamut falling into the range of the target gamut. Morgan et. al. suggested to clip the colors. Then many overflowed values are mapped to a single value. The color matching function becomes non-injective. It results that no distinction is found in those overflow values. To avoid such a deficiency, Tanioka proposed a method of reduction of a scale in a portion of values so that the overflow values can be compressed within the valid range. This contraction method suffers from the reduction of the changes of color and hence reduces the contrast. On the other hand, Lee et. al. proposed a re-mapping method with the preservation of hue and saturation. Although this method can keep the chrominance, it sacrifices the importance of luminous intensity. As mentioned above, it is impossible to exactly match all the values of two non-overlapping color gamuts.

U.S. Pat. Nos. 6,885,380 and 6,897,876 disclose a method for transforming three color input signals to four or more color output signals. According to the spatial arrangement of sub-pixels within a full-pixel, a color coordinate conversion matrix is introduced in order to convert all the colors into XYZ color space. Though the computation is simpler and it can retain the accuracy of converting colors within the overlapping part of color gamuts, the color outside gamut still has a problem of diminishing the luminance and degradation of color accuracy. The method used in U.S. Pat. Nos. 6,885,380 and 6,897,876 considers only the configuration of a single full-pixel but neglect the color interference caused by surrounding pixels.

Therefore, it is necessary to provide a color matching method to solve the above-mentioned problems.

SUMMARY OF THE INVENTION

One objective of the invention is to provide a method for transforming a color representation of a first set of color primaries with a plurality of first signals to a second set of color primaries with a plurality of second signals in a first domain. The method of the invention comprises the steps of: (a) transforming the first signals in the first domain to corresponding luminous intensity values of the color primaries in the first set in a second domain; (b) calculating a second signal of a dependent color primary in the second set according to a first function of the first signals; (c) calculating corresponding luminous intensity values of the color primaries in the second set in the second domain respectively by matching the corresponding luminous intensity values of the corresponding color primaries in the first set in the second domain; and (d) transforming the corresponding luminous intensity values of the other color primaries in the second set in the second domain to the second signals in the first domain.

The color matching method of the invention is to consider the characteristics of human visual perception. Since human is more sensitive to the luminance than the chrominance, the color matching method of the invention is considered to match not only the chrominance but also the luminous intensity. Besides, when the color is outside the gamut, we keep the information of luminance by adding extra white albeit color washout effect may be introduced. If the panel characteristics of both panels are similar, this adverse effect may not be significant. Such a color matching method of handling colors outside gamut can provide a higher contrast which is especially good for displaying a color change with numerous levels, such as sunrise or sunset scenes.

DETAILED DESCRIPTION OF THE INVENTION

Figure 1:
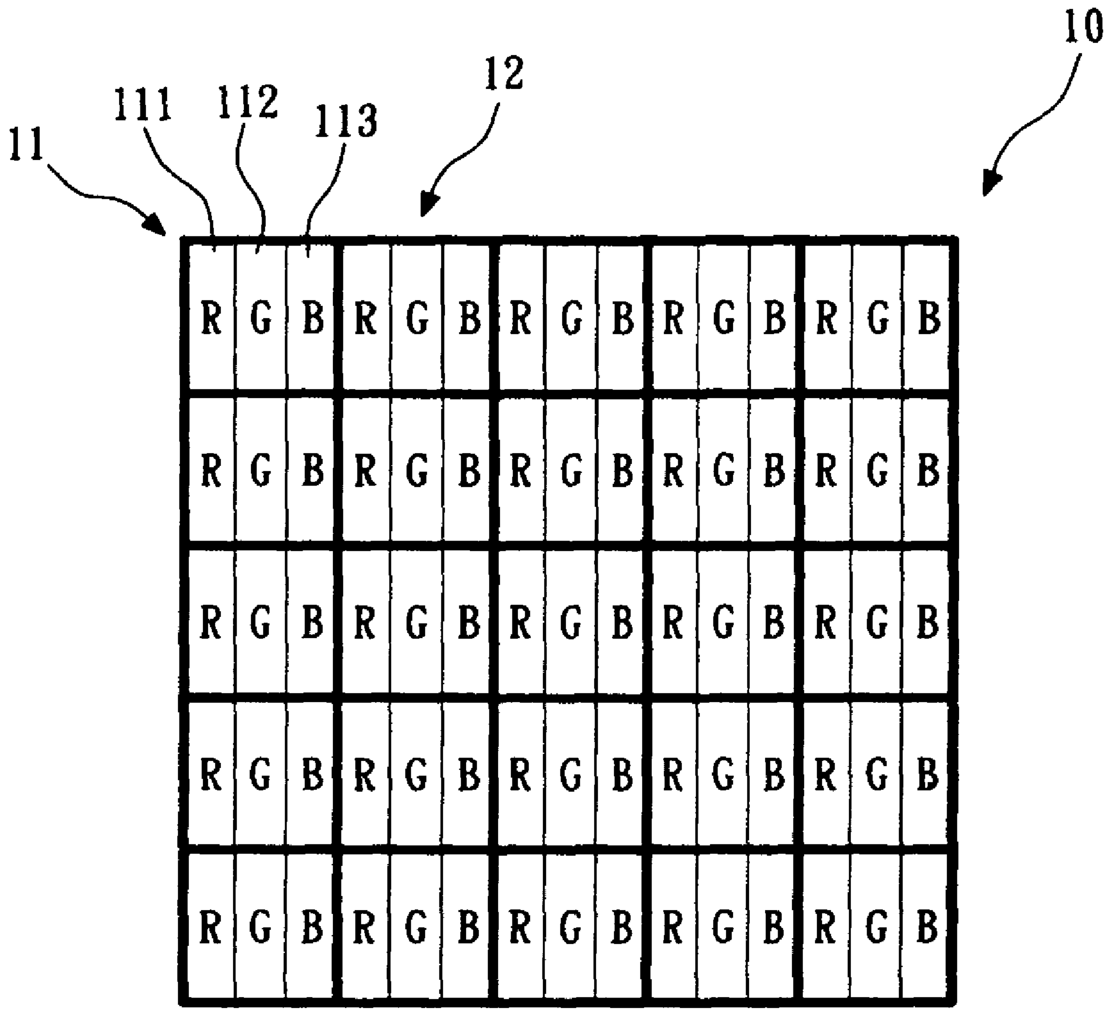
FIG. 1 shows a conventional R'G'B'-stripe display.
Figure 2:
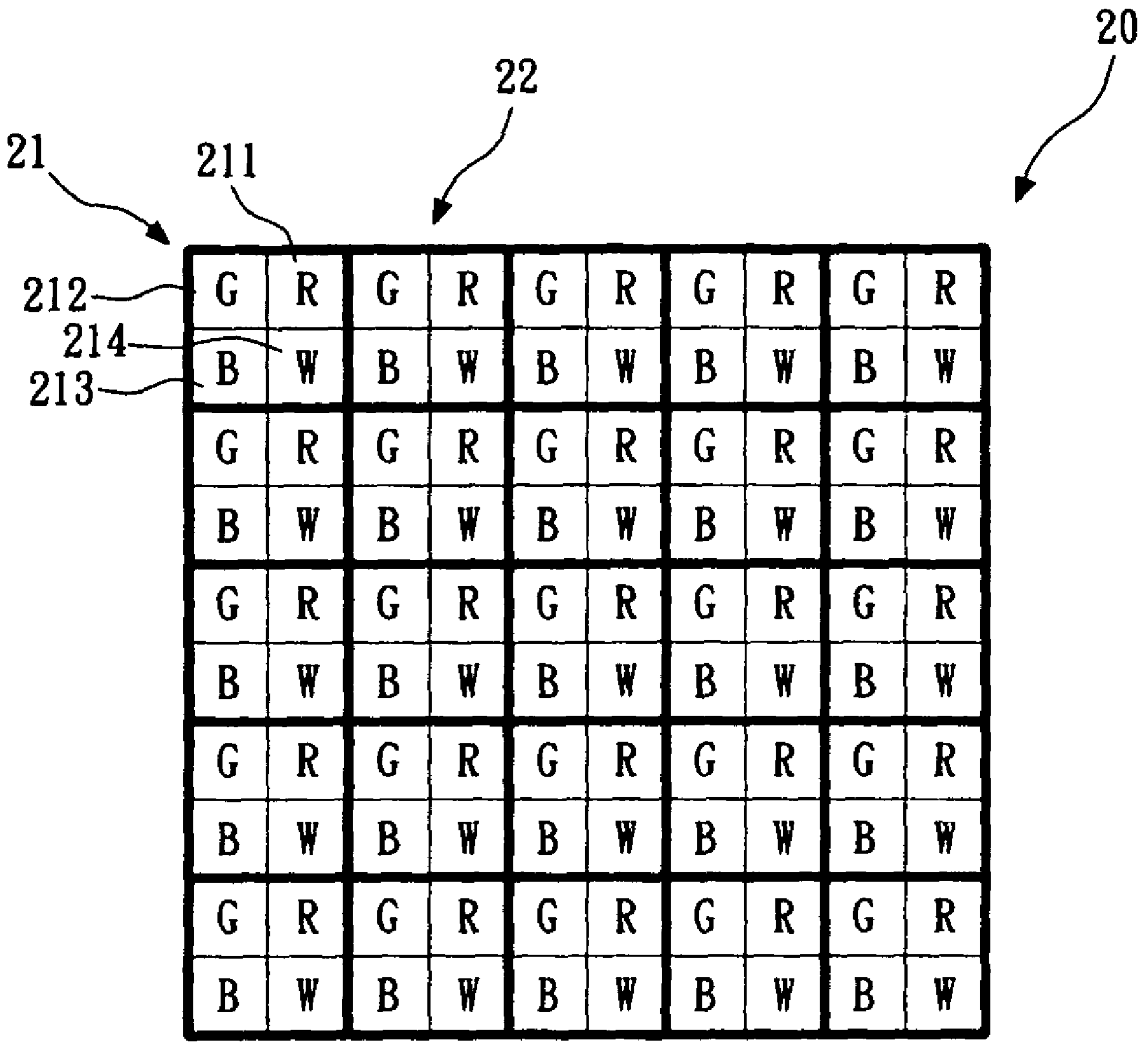
FIG. 2 shows a conventional RGBW pattern display.
Figure 2A:
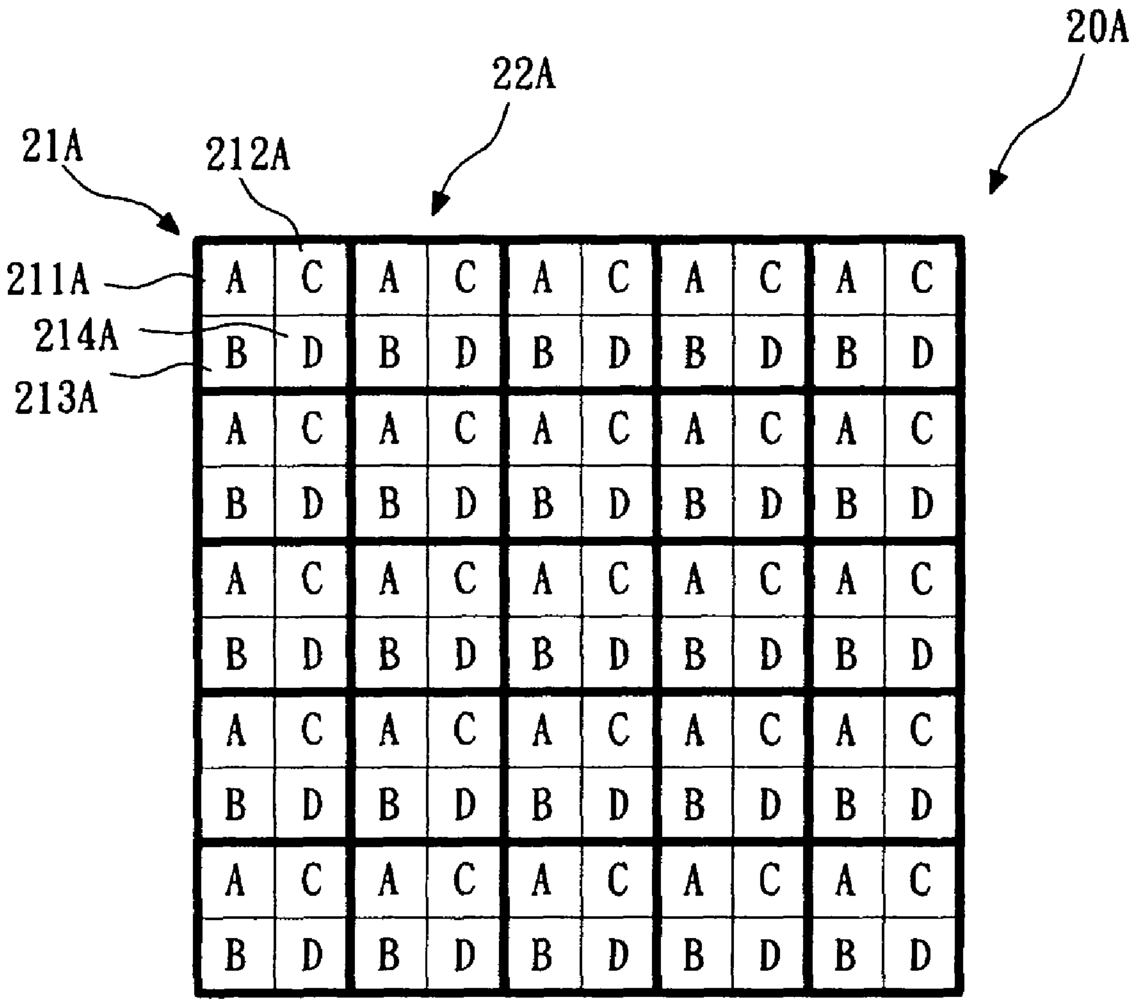
FIG. 2A shows an ABCD pattern display.

Referring to FIG. 1 and FIG. 2, they show a conventional R'G'B'-stripe display and a RGBW pattern display. The conventional R'G'B'-stripe display 10 comprises a plurality of first sets 11, 12. Each first set comprises three color primaries R, G and B. For example, the first set 11 comprises a red color primary 111, a green color primary 112 and a blue color primary 113. The conventional RGBW display 20 comprises a plurality of second sets 21, 22. Each second set comprises four color primaries R, G, B and W. For example, the second set 21 comprises a red color primary 211, a green color primary 212, a blue color primary 213 and a white color primary 214. Suppose (R', G', B') be the first signals of the color primaries of the first set, and (R, G, B, W) be the second signals of the color primaries of the second set. It is for illustrating purpose to choose R'G'B'-stripe display as the source panel and RGBW pattern display as the target panel However, the color primaries of the second set do not limit to be the (R, G, B, W). The color primaries of the second set may be the (R, G, B, Y), the (R, G, B, C), or the (R, G, B, C, M, Y) etc. Wherein, the Y is a yellow color primary, and the C is a cyan color primary. Besides, the number of the color primaries of the second set does not restrict to be four. The number of the color primaries of the second set may be five or six, etc. Referring to FIG. 2A, the ABCD display 20A comprises a plurality of second sets 21A, 22A. Each second set comprises four color primaries A, B, C and D. For example, the second set 21A comprises a color primary (A) 211A, a color primary (C) 212A, a color primary (B) 213A and a color primary (D) 214A. The color primaries (A, B, C and D) do not limit to be (R, G, B, W) and can be any colors.

According to a first embodiment of the invention, a method for transforming a color representation of a first set of color primaries with a plurality of first signals to a second set of color primaries with a plurality of second signals is disclosed. A second signal of a dependent color primary in the second set is calculated according to a first function of the color input signals. In the embodiment, the dependent color primary is W in the second set. The first function comprises a minimum function and a first rate. The minimum function is used to determine a minimum value from the first signals (R', G', B'), and the first rate is used to multiply the minimum value so as to calculate the second signal of the dependent color primary W. Suppose all the gamma factor of color primaries to be the same. Therefore, the second signal of the dependent color primary W can be calculated according to Equation (1).

$$W = \left(\frac{4}{3}\right)^{\frac{1}{\gamma}} \min(R', G', B') \quad (1)$$

Wherein, the first rate is $(4/3)^{1/\gamma}$. The 4/3 factor is used because it is a ratio of area of sub-pixel between two panels. Since human is more sensitive to the luminous intensity than chrominance, the method of the invention is considered to match the luminous intensity. Besides, human vision is non-linear in the perception of brightness. As a physical device usually uses a linear voltage to drive the color strength, a correction faction is needed to balance. The process is gamma correction. Assume the physical device uses 8-bit to represent the level of color strength; hence there are 256 levels in total. Therefore, the second signal of the dependent color primary in the second set and the first signals in the first domain are transformed respectively to a corresponding luminous intensity value of the dependent color primary and corresponding luminous intensity values of the color primary in the first set in a second domain.

Suppose the gamma correction factor γ of each color primary to be equivalent. According to the above assumption, the corresponding normalized luminous intensity value of the dependent color primary W is $(W/255)^{\gamma}$; the corresponding normalized luminous intensity value of the color primary R in the first set is $(R'/255)^{\gamma}$; the corresponding normalized luminous intensity value of the color primary G in the first set is $(G'/255)^{\gamma}$; and the corresponding normalized luminous intensity value of the color primary B in the first set is $(B'/255)^{\gamma}$. Wherein 255 is the maximum value of the 256 levels of color strength.

Neglecting the effect of luminance of the backlight and transmittance, the corresponding luminous intensity values of the other color primaries in the second set in the second domain are calculated respectively according to the corresponding luminous intensity values of the corresponding color primaries in the first set and the corresponding luminous intensity value of the dependent color primary in the second domain. That is, the corresponding luminous intensity value of the color primary R in the second set is $4/3(R'/255)^{\gamma}-(W/255)^{\gamma}$. The corresponding luminous intensity value of the color primary G in the second set is $4/3(G'/255)^{\gamma}-(W/255)^{\gamma}$. The corresponding luminous intensity value of the color primary B in the second set is $4/3(B'/255)^{\gamma}-(W/255)^{\gamma}$.

Finally, the corresponding luminous intensity values of the color primaries in the second set in the second domain are transformed to the second signals in the first domain. Given the above, the second signals of the color primaries R, G, B can be calculated according to Equations (2), (3) and (4) respectively as follows.

$$R = 255\left[\frac{4}{3}\left(\frac{R'}{255}\right)^{\gamma} - \left(\frac{W}{255}\right)^{\gamma}\right]^{\frac{1}{\gamma}} \quad (2)$$

$$G = 255\left[\frac{4}{3}\left(\frac{G'}{255}\right)^{\gamma} - \left(\frac{W}{255}\right)^{\gamma}\right]^{\frac{1}{\gamma}} \quad (3)$$

-continued $$B = 255\left[\frac{4}{3}\left(\frac{B'}{255}\right)^{\gamma} - \left(\frac{W}{255}\right)^{\gamma}\right]^{\frac{1}{\gamma}} \tag{4}$$

However, if the difference between R', G', B' is large, some of values of R, G, B may still be overflow. Therefore, it requires an additional process to transform the values of colors outside the gamut falling into the range of the target gamut. In the invention, we adopt a method of expansion by keeping the luminance but scarifying the matching of chrominance. When the color is outside the gamut, we keep the information of luminance by adding extra white. The algorithm is divided into four cases.

Before the corresponding luminous intensity values of the other color primaries in the second set in the second domain are calculated, the minimum value min.(R', G', B') is determined whether the minimum value is larger than a first coefficient. In the embodiment, the first coefficient is $(3/4)^{1/\gamma}$ 255, wherein 255 is the maximum value that the target panel can display. If the minimum value is larger than the first coefficient, the second signal of the dependent color primary W will be set to a first constant, and the corresponding luminous intensity values of the other color primaries in the second set in the second domain will be calculated respectively according to the corresponding luminous intensity values of the corresponding color primaries in the first set and the first constant. The first constant is a maximum value of level of color strength, and the first constant is 255 in the embodiment. The second signal of the dependent color primary W is 255.

Besides, the corresponding luminous intensity value of color primary R is calculated according to the corresponding luminous intensity value of color primary R', the corresponding luminous intensity value of color primary G is calculated according to the corresponding luminous intensity value of color primary G', the corresponding luminous intensity value of color primary B is calculated according to the corresponding luminous intensity value of color primary B'. If the minimum value min(R', G', B') is larger than a first coefficient $(3/4)^{1/\gamma}$ 255, then Equations (2), (3) and (4) are simplified respectively as follows.

$$R = 255\left[\frac{4}{3}\left(\frac{R'}{255}\right)^{\gamma} - 1\right]^{\frac{1}{\gamma}} \tag{5}$$

$$G = 255\left[\frac{4}{3}\left(\frac{G'}{255}\right)^{\gamma} - 1\right]^{\frac{1}{\gamma}} \tag{6}$$

$$B = 255\left[\frac{4}{3}\left(\frac{B'}{255}\right)^{\gamma} - 1\right]^{\frac{1}{\gamma}} \tag{7}$$

If the minimum value is not larger than the first coefficient, one of the second signals of color primaries R, G and B is set to a second constant, and the corresponding color output luminous intensity values of the other color primaries in the second set in the second domain are calculated respectively according to the corresponding color input luminous intensity values of the corresponding color primaries in the first set and the corresponding luminous intensity value of the dependent color primary W in the second domain. The second constant is a minimum value of level of color strength, and the second constant is zero in the embodiment.

In other words, when the first signal of color primary R' is the minimum value, the second signal of color primary R is the second constant, the corresponding luminous intensity value of color primary G is calculated according to the corresponding luminous intensity values of color primary G' and the color primary R', the corresponding luminous intensity value of color primary B is calculated according to the corresponding luminous intensity values of color primary B' and the color primary R'. Equations (1), (2), (3) and (4) are simplified respectively as follows.

$$W = \left(\frac{4}{3}\right)^{\frac{1}{\gamma}} R' \tag{8}$$

$$R = 0 \tag{9}$$

$$G = 255\left\{\frac{4}{3}\left[\left(\frac{G'}{255}\right)^{\gamma} - \left(\frac{R'}{255}\right)^{\gamma}\right]\right\}^{\frac{1}{\gamma}} \tag{10}$$

$$B = 255\left\{\frac{4}{3}\left[\left(\frac{B'}{255}\right)^{\gamma} - \left(\frac{R'}{255}\right)^{\gamma}\right]\right\}^{\frac{1}{\gamma}} \tag{11}$$

When the first signal of color primary G' is the minimum value, the second signal of color primary G is the second constant, the corresponding luminous intensity value of color primary R is calculated according to the corresponding luminous intensity value of color primary R' and the color primary G', the corresponding luminous intensity value of color primary B is calculated according to the corresponding luminous intensity values of color primary B' and the color primary G'.

$$W = \left(\frac{4}{3}\right)^{\frac{1}{\gamma}} G' \tag{12}$$

$$R = 255\left\{\frac{4}{3}\left[\left(\frac{R'}{255}\right)^{\gamma} - \left(\frac{G'}{255}\right)^{\gamma}\right]\right\}^{\frac{1}{\gamma}} \tag{13}$$

$$G = 0 \tag{14}$$

$$B = 255\left\{\frac{4}{3}\left[\left(\frac{B'}{255}\right)^{\gamma} - \left(\frac{G'}{255}\right)^{\gamma}\right]\right\}^{\frac{1}{\gamma}} \tag{15}$$

When, the first signal of color primary B' is the minimum value, the second signal of color primary B is the second constant, the corresponding luminous intensity value of color primary R is calculated according to the corresponding luminous intensity value of color primary R' and the color primary B', the corresponding luminous intensity value of color primary G is calculated according to the corresponding luminous intensity values of color primary G' and the color primary B'.

$$W = \left(\frac{4}{3}\right)^{\frac{1}{\gamma}} B' \tag{16}$$

$$R = 255\left\{\frac{4}{3}\left[\left(\frac{R'}{255}\right)^{\gamma} - \left(\frac{B'}{255}\right)^{\gamma}\right]\right\}^{\frac{1}{\gamma}} \tag{17}$$

$$G = 255\left\{\frac{4}{3}\left[\left(\frac{G'}{255}\right)^{\gamma} - \left(\frac{B'}{255}\right)^{\gamma}\right]\right\}^{\frac{1}{\gamma}} \tag{18}$$

$$B = 0 \tag{19}$$

According to a second embodiment of the invention, a color matching method for transforming a color representation of the first set (R'G'B'-stripe) of color primaries with the first signals (R', G', B') to the second set (RGBW pattern) of color primaries with the second signals (R, G, B, W) in a first domain is disclosed. However, the characteristics of different panels may be different especially if the panels have different color primaries with different configurations of arrangement. In most of the cases, both color gamuts are different. There may not exist any colors in the target panel, which can exactly match a color in the source panel.

Figure 3A:
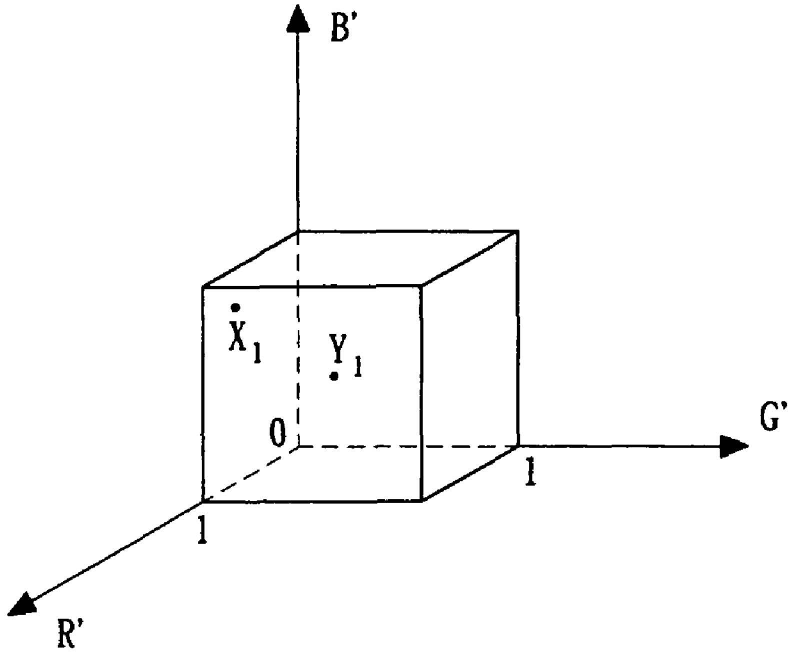
FIG. 3A shows the color gamut of the source panel (R'G'B'-stripe).
Figure 3B:
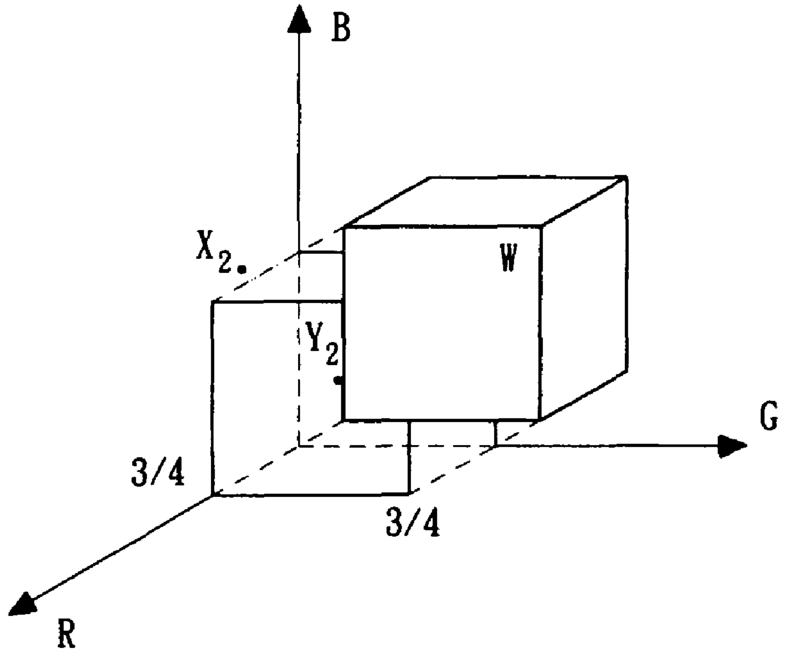
FIG. 3B shows the color gamut of the target panel (RGBW).

Referring to FIG. 3A and FIG. 3B, they show the color gamut of the source panel (R'G'B'-stripe) and the color gamut of the target panel (RGBW). The color gamut of the source panel (R'G'B'-stripe) is different from that of the target panel (RGBW). Therefore, some colors cannot be perfected matched from the source panel to the target panel. For example, a color Y1 in the color gamut of the source panel (R'G'B'-stripe) can be matched to a color Y2 in the color gamut of the target panel (RGBW), but a color X1 in the color gamut of the source panel (R'G'B'-stripe) cannot be matched a color X2 outside the color gamut of the target panel (RGBW).

The conventional color matching method is to match the same value of chrominance. Therefore, the conventional color matching method must utilize complex arctangent ($\tan^{-1}$) function or square function to match the chrominance. The color matching method of the invention is considered to match the luminous intensity of each color primary, and has the following advantages.

1. If the color within the color gamut, matching the luminous intensity of each primitive color primary of source panel implies matching the chrominance.
2. Calculation of luminous intensity is simpler than the calculation of chrominance. Luminous intensity is linearly super imposable.
3. Human is more sensitive on luminous intensity than chrominance.

Figure 4A:
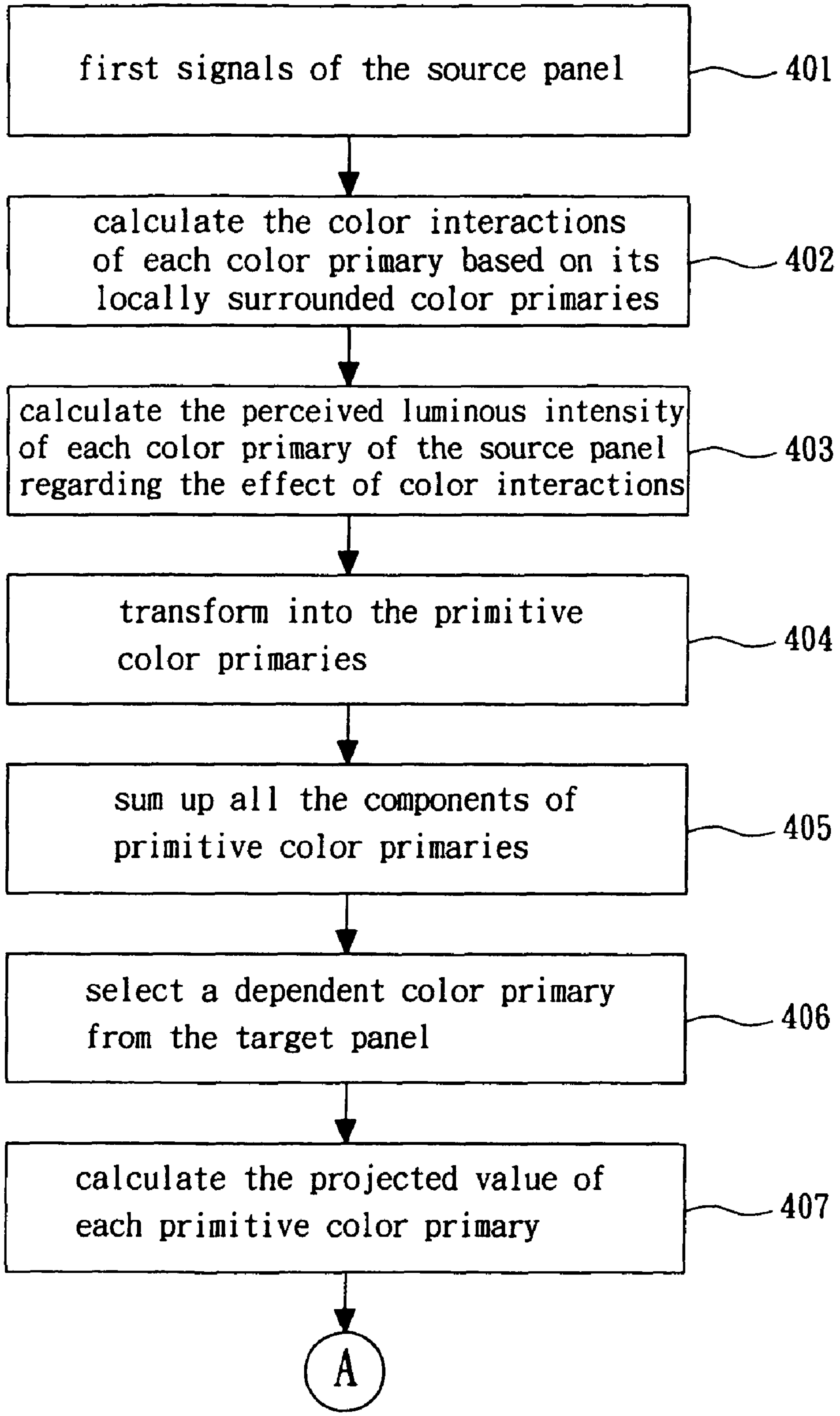
FIGS. 4A to 4D show the flow chart of the color matching method of the invention.
Figure 4B:
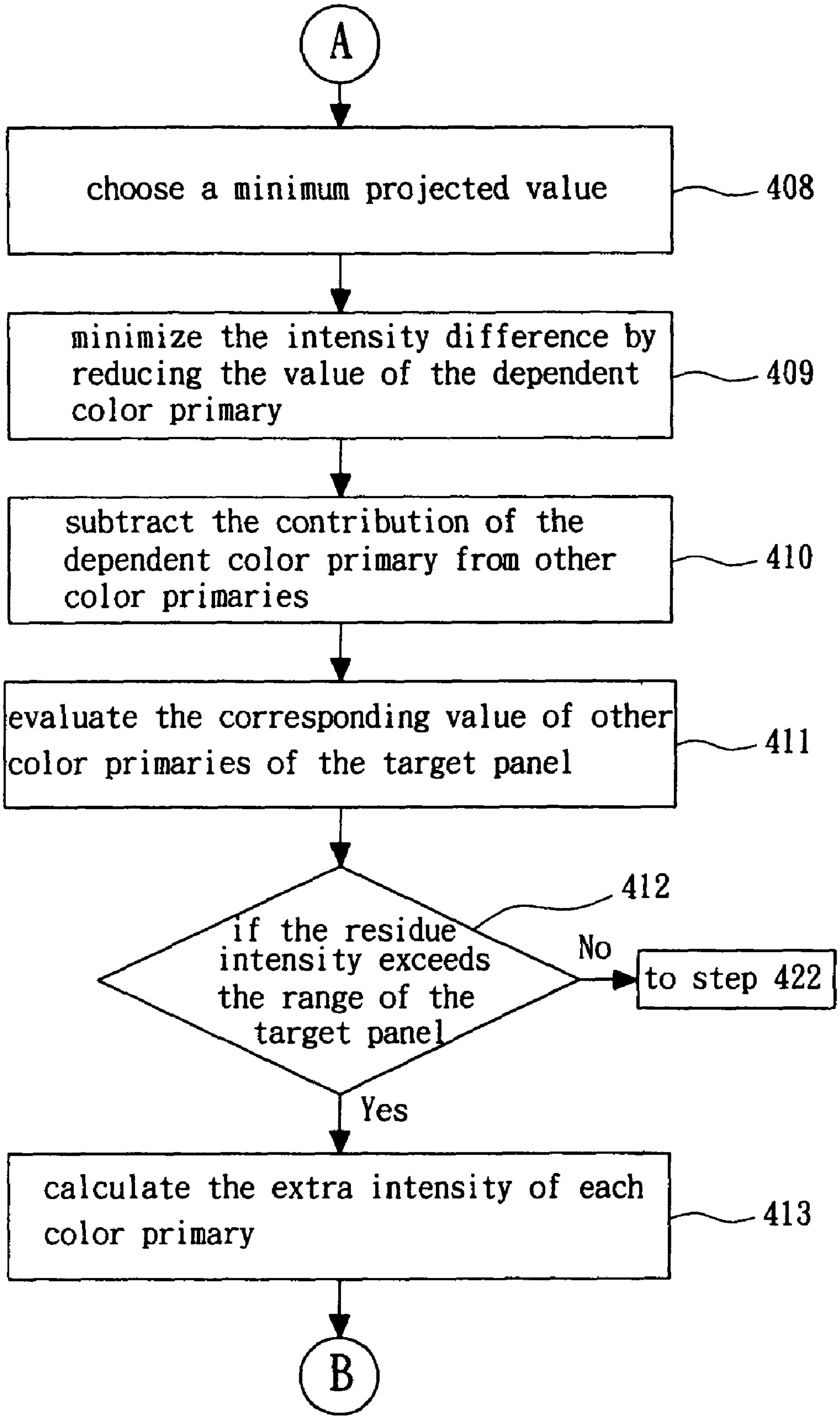
Figure 4C:
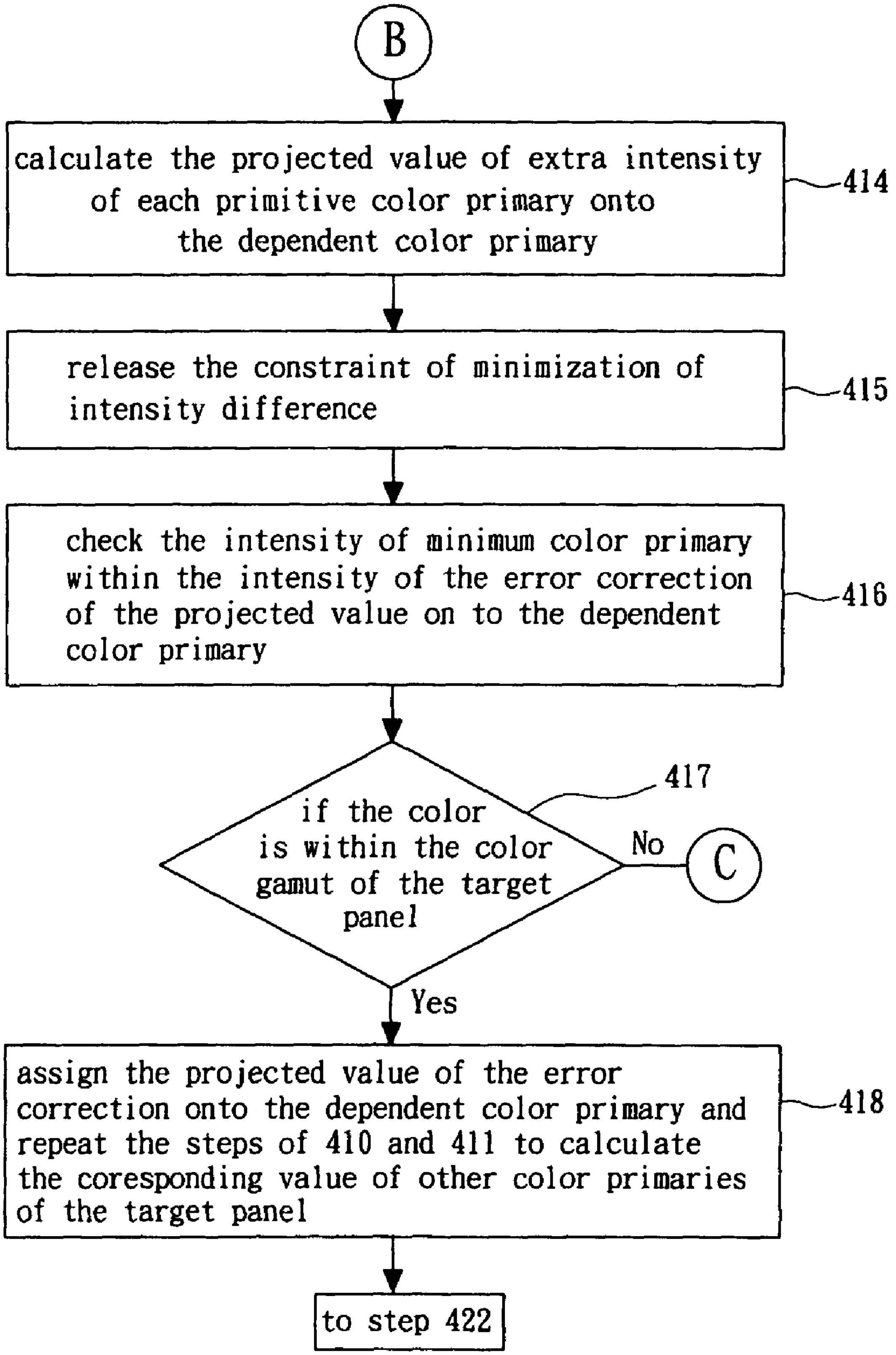
Figure 4D:
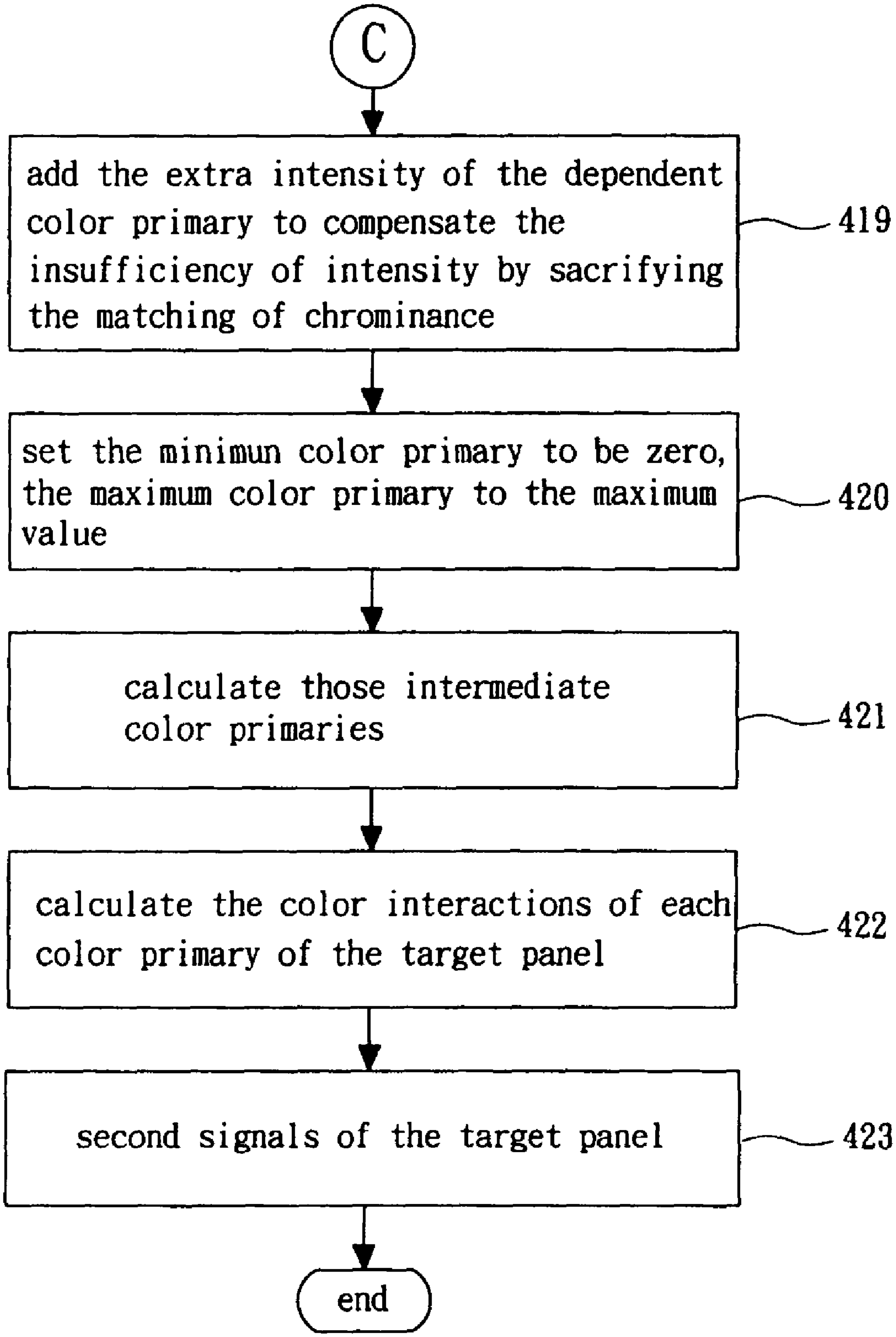

According to the color matching method of the invention, the first signals (R', G', B') in the first domain are transformed to corresponding luminous intensity values of the color primary in the first set in a second domain according to the characteristics of the source panel, as shown in step 403 of FIG. 4A. The characteristics of the source panel comprise: gamma correction factor, transmittance area of the color sub-pixel, power of the backlight, the number of bits for changing the value of the color (the number of step changes of switching the liquid crystal controlling the luminous intensity of light emitting through the color sub-pixel) as described below.

Let R', G', B' be the first signals of red, green, blue colors of the R'G'B' panel in the first domain. Let $\gamma_{R'}$, $\gamma_{G'}$, $\gamma_{B'}$ be the corresponding gamma correction factors of red, green, blue color primaries of the R'G'B' panel. Let $T_{R'}$, $T_{G'}$, $T_{B'}$ be the corresponding transmittance of red, green, blue filters of the R'G'B' panel. Let $A_{R'}$, $A_{G'}$, $A_{B'}$ be the corresponding area of red, green, blue color primaries of the R'G'B' panel. Let $L_{R'}$, $L_{G'}$, $L_{B'}$ be the corresponding luminance of the fully-switched-on red, green, blue color primaries of the R'G'B' panel. Let $I_{R'}$, $I_{G'}$, $I_{B'}$ be the corresponding luminous intensity of red, green, blue color primaries of the R'G'B' panel at the values of R', G', B'. Let $I_{R'}^0$, $I_{G'}^0$, $I_{B'}^0$ be the corresponding luminous intensity of fully-switched-on red, green, blue color primaries of the R'G'B' panel. Let m be the number of bits of color depth of each color primary in the R'G'B' panel.

$$\Rightarrow \begin{cases} I_{R'} = \left(\frac{R'}{2^m-1}\right)^{\gamma_{R'}} I_{R'}^0 \\ I_{G'} = \left(\frac{G'}{2^m-1}\right)^{\gamma_{G'}} I_{G'}^0 \\ I_{B'} = \left(\frac{B'}{2^m-1}\right)^{\gamma_{B'}} I_{B'}^0 \end{cases} \tag{20}$$

where $$\begin{cases} I_{R'}^0 = T_{R'}A_{R'}L_{R'} \\ I_{G'}^0 = T_{G'}A_{G'}L_{G'} \\ I_{B'}^0 = T_{B'}A_{B'}L_{B'} \end{cases} \tag{21}$$

Since human is more sensitive to the luminous intensity than chrominance, the color matching method of the invention is considered to match the luminous intensity of each primitive color primary. Besides, human vision is non-linear in the perception of brightness. As a physical device usually uses a linear voltage to drive the color strength, a correction faction is needed to balance. The process is gamma correction. Assume the physical device uses 8-bit to represent the level of color strength; hence there are 256 levels in total (m=8).

Because the above parameters are known, the corresponding luminous intensity $I_{R'}$, $I_{G'}$, $I_{B'}$ of color primaries (red, green, blue) of the R'G'B' panel at the values of R', G', B' can be calculated. Similarly, the luminous intensities of color primaries (red, green, blue, white) of the RGBW panel are expressed as follows:

Let R, G, B, W be the second signals of red, green, blue, white color primaries of the RGBW panel in the first domain. Let $\gamma_R$, $\gamma_G$, $\gamma_B$, $\gamma_W$ be the corresponding gamma correction factors of red, green, blue, white color primaries of the RGBW panel. Let $T_R$, $T_G$, $T_B$, $T_W$ be the corresponding transmittance of red, green, blue, white filters of the RGBW panel. Let $A_R$, $A_G$, $A_B$, $A_W$ be the corresponding area of red, green, blue, white color primaries of the RGBW panel. Let $L_R$, $L_G$, $L_B$, $L_W$ be the corresponding luminance of fully-switched-on red, green, blue, white color primaries of the RGBW panel. Let $I_R$, $I_G$, $I_B$, $I_W$ be the corresponding luminous intensity of red, green, blue, white color primaries of the RGBW panel at the values of R, G, B, W. Let $I_R^0$, $I_G^0$, $I_B^0$, $I_W^0$ be the corresponding luminous intensity of fully-switched-on red, green, blue, white color primaries of the RGBW panel. Let n be the number of bits of color depth of each color primary in the RGBW panel.

$$\begin{cases} I_R = \left(\frac{R}{2^n-1}\right)^{\gamma_R} I_R^0 \\ I_G = \left(\frac{G}{2^n-1}\right)^{\gamma_G} I_G^0 \\ I_B = \left(\frac{B}{2^n-1}\right)^{\gamma_B} I_B^0 \\ I_W = \left(\frac{W}{2^n-1}\right)^{\gamma_W} I_W^0 \end{cases} \tag{22}$$

where

-continued $$\begin{cases} I_R^0 = T_R A_R L_R \\ I_G^0 = T_G A_G L_G \\ I_B^0 = T_B A_B L_B \\ I_W^0 = T_W A_W L_W \end{cases} \quad (23)$$

Let $I_{R}^{t}$, $I_{G}^{t}$, $I_{B}^{t}$ be the total luminous intensity of red, green, blue color of a full-pixel in the RGBW panel. Let Y', U' (or $C'_b$), V' (or $C'_r$) be the luminance, blue chrominance, and red chrominance respectively of a full-pixel in the R'G'B' panel and Y, U (or $C_b$), V (or $C_r$) be the luminance, blue chrominance, and red chrominance respectively of a full-pixel in the RGBW panel. As the color spaces used in both R'G'B' and RGBW panel are assumed to be the same, same values of luma and chroma coefficients are being used. In the embodiment of the invention, we assume that the source panel is the R'G'B' panel. If the source panel is not the R'G'B' panel, each color primary of the source panel must resolve into the basis of primitive color primaries (R'G'B') as shown in step 404.

$$\begin{cases} Y' = k_r \frac{R'}{2^m - 1} + k_g \frac{G'}{2^m - 1} + k_b \frac{B'}{2^m - 1} \\ U' = C_b' = \varepsilon_b (B' - Y') \\ V' = C_r' = \varepsilon_r (R' - Y') \end{cases} \quad (24)$$

$$\begin{cases} Y = k_r \frac{R}{2^n - 1} + k_g \frac{G}{2^n - 1} + k_b \frac{B}{2^n - 1} + \frac{W}{2^n - 1} \\ U = C_b = \varepsilon_b \left( \frac{B}{2^n - 1} + k_b \frac{W}{2^n - 1} - Y \right) \\ V = C_r = \varepsilon_r \left( \frac{R}{2^n - 1} + k_r \frac{W}{2^n - 1} - Y \right) \end{cases} \quad (25)$$

Let $k_r$, $k_g$, $k_b$ be the luma coefficients of corresponding red, green, blue colors of the color space used in the model, and $\epsilon_r$, $\epsilon_g$, $\epsilon_b$ be the chroma coefficients of corresponding red, green, blue colors of the color space used in the model. In the above equations (24) and (25), where $$k_r + k_g + k_b = 1$$

then, all the components of primitive color primaries are summed up as shown in step 405. Therefore, the total luminous intensities of red, green, blue color of a full-pixel in the RGBW panel are formulated as below:

$$\Rightarrow \begin{cases} I_R^t = I_R + k_r I_W \\ I_G^t = I_G + k_g I_W \\ I_B^t = I_B + k_b I_W \end{cases} \quad (26)$$

Because human vision is more sensitive on luminance rather than chrominance, the color matching method of the invention is executed based upon the equalization of luminous intensity. If the color of the R'G'B' panel is inside the color gamut of the RGBW panel, equating the luminous intensity of each primitive color primary also implies equating the chrominance. Hence, $$\begin{cases} I_{R'} = I_R^t \\ I_{G'} = I_G^t \\ I_{B'} = I_B^t \end{cases} \quad (27)$$

However, in Equation (26), there are four variables $I_R$, $I_G$, $I_B$, $I_W$ on the RHS (Right Hand Side) while only three known variables $I_{R'}$, $I_{G'}$, $I_{B'}$ on the LHS (Left Hand Side). It is not a system of full rank linear equations. In order to solve it exactly, an additional constraint is added. Referring to step 406, a dependent color primary is selected from the target panel. In the embodiment, the dependent color primary is White color primary in the second set RGBW panel. As the dependent color primary (White color primary) is a linear combination of the other color primaries (red, green and blue), the optimal case is to assign the value of the dependent color primary (White color primary) which component luminous intensity is equal to the minimum luminous intensity of R, G, B.

Referring to step 407, the projected values of color primaries (R', G', B') of the first set (R'G'B' panel) into the dependent color primary of the RGBW panel are calculated. Because we want to make sure the projected values within the range $0 \leqq W \leqq 2^n - 1$ and the contribution of R, G, B on W is not equal, the projected values are necessary. Let $W_{R'}$, $W_{G'}$, $W_{B'}$ be the projected values of color primaries (R', G', B') of the first set (R'G'B' panel) into the dependent color primary of the RGBW panel.

$$\begin{cases} I_{R'} = \left( \frac{W_{R'}}{2^n - 1} \right)^{\gamma_W} k_r I_W^0 \\ I_{G'} = \left( \frac{W_{G'}}{2^n - 1} \right)^{\gamma_W} k_g I_W^0 \\ I_{B'} = \left( \frac{W_{B'}}{2^n - 1} \right)^{\gamma_W} k_b I_W^0 \end{cases} \quad (28)$$

$$\Rightarrow \begin{cases} W_{R'} = \left( \frac{I_{R'}}{k_r I_W^0} \right)^{\frac{1}{\gamma_W}} (2^n - 1) \\ W_{G'} = \left( \frac{I_{G'}}{k_g I_W^0} \right)^{\frac{1}{\gamma_W}} (2^n - 1) \\ W_{B'} = \left( \frac{I_{B'}}{k_b I_W^0} \right)^{\frac{1}{\gamma_W}} (2^n - 1) \end{cases} \quad (29)$$

Referring to the step 408, $W = \min\{W_{R'}, W_{G'}, W_{B'}\}$ is chosen as the extra constraint because of the optimality of resource distribution, and then the solution of R, G, B can be calculated. On the other side, although assigning the minimum luminous intensity into the dependent color primary to be an optimal solution, it increases the differences among color primaries within a single full-pixel. Because our eyes are sensitive to a high contrast, it results the roughness of color perception especially for an image with a scene of a gradual change of colors as well as with very bright and sharp colors like white text in a black color background. To improve the smoothness of color, an add-on condition is appended instead of choosing the optimal solution as above. Referring to the step 409, the second signal of the dependent color primary is reduced to minimize the luminous intensity difference among color primaries of the target panel. That is to equate the luminous intensity of minimum color primary with the luminous intensity of the dependent color primary. Therefore, the second signal of the dependent color primary can be calculated as follows.

$$W=\left(\frac{1}{2}\right)^{\frac{1}{\gamma_W}}\min\{W_{R'},W_{G'},W_{B'}\}\tag{30}$$

That is, after the corresponding luminous intensity $I_{R'}$, $I_{G'}$, $I_{B'}$ of color primaries (red, green, blue) of the R'G'B' panel at the values of R', G', B' are calculated according to Equations (20) and (21), the second signal of the dependent color primary in the second set can be calculated according to a first function of the corresponding luminous intensity values $I_{R'}$, $I_{G'}$, $I_{B'}$ of the color primaries in the first set in the second domain. In details, the projected values $W_{R'}$, $W_{G'}$, $W_{B'}$ of the first set of color primaries into the dependent color primary are calculated according to the corresponding luminous intensity values $I_{R'}$, $I_{G'}$, $I_{B'}$ of the color primaries in the first set in the second domain as shown in Equation (29). Then, a minimum value is determined from the projected values $W_{R'}$, $W_{G'}$, $W_{B'}$, and a first coefficient is multiplied to the minimum value so as to calculate the second signal of the dependent color primary as shown in Equation (30). The first coefficient is $(\frac{1}{2})^{1/\gamma_w}$.

Once the second signal of the dependent color primary is fixed, the second signals (R, G, B) of the other color primaries can be calculated as below:

Let $I_R^r$, $I_G^r$, $I_B^r$ be the residue luminous intensity of the other color primaries (red, green and blue) after subtracting the corresponding component in the white color primary of the RGBW panel as shown in steps 410 and 411.

$$\begin{cases}I_R^r=I_R^t-k_rI_W\\I_G^r=I_G^t-k_gI_W\\I_B^r=I_B^t-k_bI_W\end{cases}\tag{31}$$

$$\Rightarrow\begin{cases}R=\left(\frac{I_R^r}{I_R^0}\right)^{\frac{1}{\gamma_R}}(2^n-1)\\G=\left(\frac{I_G^r}{I_G^0}\right)^{\frac{1}{\gamma_G}}(2^n-1)\\B=\left(\frac{I_B^r}{I_B^0}\right)^{\frac{1}{\gamma_B}}(2^n-1)\end{cases}\tag{32}$$

Therefore, the corresponding luminous intensity values $I_R^r$, $I_G^r$, $I_B^r$, $I_W$ of the color primaries in the second set in the second domain are calculated respectively according to the corresponding luminous intensity values of the corresponding color primaries in the first set in the second domain and the second signal of the dependent color primary in the second set.

After the second signal of the dependent color primary is calculated, the luminous intensity value $I_W$ of the dependent color primary can be obtained according to the second signal of the dependent color primary in the second set as Equation (22). The luma coefficients $k_r$, $k_g$, $k_b$ of the corresponding red, green and blue color primaries are multiplied respectively to the corresponding luminous intensity value $I_W$ of the dependent color primary to form the corresponding luminous intensity components of the corresponding red, green and blue color primaries in the dependent color primary, then the corresponding luminous intensity components are subtracted from the corresponding luminous intensity values $I_{R'}$, $I_{G'}$, $I_{B'}$ of the corresponding color primaries in the first set in the second domain to form the corresponding luminous intensity values $I_R^r$, $I_G^r$, $I_B^r$ of the color primaries in the second set in the second domain as Equation (31), wherein the total luminous intensity $I_R^t$, $I_G^t$, $I_B^t$ of red, green, blue color of a full-pixel in the RGBW panel is equal to the corresponding luminous intensity values $I_{R'}$, $I_{G'}$, $I_{B'}$ of the corresponding color primaries in the first set in the second domain as Equation (27).

After the corresponding luminous intensity values $I_R^r$, $I_G^r$, $I_B^r$ of the color primaries in the second set in the second domain are calculated, the corresponding luminous intensity values $I_R^r$, $I_G^r$, $I_B^r$ of the other color primaries in the second set in the second domain are transformed to the second signals (R, G, B) of the other color primaries in the first domain as Equation (32), wherein Equation (32) is derived from Equation (22).

However, if the differences between R', G', B' are large, some of values of R, G, B may still be overflow. Therefore, it requires an additional process to transform the values of colors outside the gamut falling into the range of the target gamut. In the invention, we adopt a method of expansion by keeping luminance, but chrominance will be shifted. When the color is outside the gamut, we keep the information of luminance by adding extra white.

Therefore, after the second signals R, G, B, W of the color primaries of the RGBW panel are calculated, we consider further the cases of $I_C^r>I_C^0$ where $C\in\{R,G,B|W_{C'}\neq\min\{W_{R'},W_{G'},W_{B'}\}\}$. That is, we determine whether the corresponding luminous intensity values of the color primaries in the second set in the second domain is larger than the corresponding luminous intensity values of fully-switched on color primaries in the second set as shown in the step 412.

When the corresponding luminous intensity values of the color primaries in the second set in the second domain are larger than the corresponding luminous intensity values of fully-switched on color primaries in the second set, the corresponding extra luminous intensity values of the color primaries in the second set are calculated by subtracting the corresponding luminous intensity values of fully-switched on color primaries in the second set from the corresponding luminous intensity values of the corresponding color primaries in the second set.

If the residue luminous intensity exceeds the range of the target panel, the extra luminous intensity of each color primary is calculated as shown in the step 413. Let $I_R^e$, $I_G^e$, $I_B^e$ be the extra luminous intensity of the residue luminous intensity compared with the luminous intensity of corresponding fully-switched-on red, green, blue color in the RGBW panel.

$$\begin{cases}I_R^e=I_R^r-I_R^0\\I_G^e=I_G^r-I_G^0\\I_B^e=I_B^r-I_B^0\end{cases}\tag{33}$$

The error correction must be made in order to match the intensities for all color primaries. So the condition of minimizing the differences of value of color primaries in a single full-pixel is released. That is, in Equation (30), the first coefficient change the value is adjusted from $(\frac{1}{2})^{1/\gamma_w}$ to one so as to increase the second signal of the dependent color primary. The corresponding error correction values of the dependent color primary are calculated according to the corresponding extra luminous intensity values of the color primaries in the second set.

Then, the projected value of extra luminous intensity of each primitive color primary on to the dependent color primary is calculated as shown in the step 414. Let $W_R^e$, $W_G^e$, $W_B^e$ be the values of the dependent color primary including error correction due to the extra intensities of R, G, B color primaries.

$$\Rightarrow \begin{cases} W_R^e = \left(\frac{I_R^e + k_r I_W}{I_R^0}\right)^{\frac{1}{\gamma_R}}(2^n - 1) \\ W_G^e = \left(\frac{I_G^e + k_g I_W}{I_G^0}\right)^{\frac{1}{\gamma_G}}(2^n - 1) \\ W_B^e = \left(\frac{I_B^e + k_b I_W}{I_B^0}\right)^{\frac{1}{\gamma_B}}(2^n - 1) \end{cases} \tag{34}$$

Then, a minimum color primary in the second set is determined according to the minimum value, and a maximum color primary in the second set is determined according to the corresponding error correction values of the dependent color primary. Referring to the step 415, we release the constraint of minimization of luminous intensity difference up to the constraint of optimality, that is $W = \min\{W_{R'}, W_{G'}, W_{B'}\}$.

$$\text{Let } C_{min} = C \in \{R, G, B \mid W_{C'} = \min\{W_{R'}, W_{G'}, W_{B'}\}\} \tag{35}$$

$$C_{max}^e = C \in \{R, G, B \mid W_C^e = \max\{W_R^e, W_G^e, W_B^e\}\} \tag{36}$$

The luminous intensity value $I_{C_{min}}$ of the minimum color primary $C_{min}$ is calculated, and the corresponding error correction luminous intensity values of the color primaries in the second set are calculated according to the corresponding error correction values $W_R^e$, $W_G^e$, $W_B^e$ of the dependent color primary. Then, we determine whether each corresponding error correction luminous intensity value of the color primaries in the second set is smaller than or equal to the luminous intensity value $I_{C_{min}}$ of the minimum color primary $C_{min}$, i.e. to check whether the color is within the color gamut of the target panel.

Referring to the step 416, we check the luminous intensity of minimum color primary within the luminous intensity of the error correction of the projected value on to the dependent color primary. Referring to the step 417, we determine whether the color is within the color gamut of the target panel. If all color primaries $$\left(\frac{W_{C \in \{R,G,B\}}^e}{2^n - 1}\right)^{\gamma_W} k_g I_W^0 \le I_{C_{min}},$$

the color must be within the color gamut of RGBW panel. Choose $$W = W_{C_{max}^e}^e \tag{37}$$

$$\Rightarrow \begin{cases} R = \left(\frac{I_{R'} + k_r I_W}{I_R^0}\right)^{\frac{1}{\gamma_R}}(2^n - 1) \\ G = \left(\frac{I_{G'} + k_g I_W}{I_G^0}\right)^{\frac{1}{\gamma_G}}(2^n - 1) \\ B = \left(\frac{I_{B'} + k_b I_W}{I_B^0}\right)^{\frac{1}{\gamma_B}}(2^n - 1) \end{cases} \tag{38}$$

Referring to the step 418, when the corresponding error correction luminous intensity values of the color primaries in the second set are smaller than or equal to the luminous intensity value $I_{C_{min}}$ of the minimum color primary $C_{min}$, the adjusted second signal of the dependent color primary is equal to a maximum value of the corresponding error correction values of the dependent color primary as Equation (37). The luminous intensity value $I_W$ of the dependent color primary is calculated according to the adjusted second signal of the dependent color primary as Equation (22). The adjusted second signals R, G, B of the other color primaries are calculated according to the luminous intensity values $I_W$ of the dependent color primary and the corresponding luminous intensity values $I_{R'}$, $I_{G'}$, $I_{B'}$ of the color primaries in the first set as Equation (38).

In the prior art, if the color is outside the color gamut of the target panel, the prior art use clipping, contraction or remapping method. The problems of the prior art have been described above.

On the other side, according to the color matching method of the invention, if $$\left(\frac{W_{C_{max}^e}^e}{2^n - 1}\right)^{\gamma_W} k_{C_{max}^e} I_W^0 > I_{C_{min}}, \text{ then}$$

$$\Rightarrow \begin{cases} C_{min} = 0 \\ C_{max}^e = 2^n - 1 \\ C(\neq C_{min}, C_{max}^e) = \begin{cases} 2^n - 1 & \text{if } \left(\frac{W_C^e}{2^n - 1}\right)^{\gamma_W} k_c I_W^0 > I_{C_{min}} \\ \left(\frac{I_C^t - \frac{k_c}{k_{c_{min}}} I_{C'_{min}}}{I_C^0}\right)^{\frac{1}{\gamma_c}}(2^n - 1) & \text{otherwise} \end{cases} \\ W = \left(\frac{\frac{1}{k_{c_{min}}} I_{C'_{min}} + \frac{1}{k_{c_{max}^e}}\left(I_{C_{max}^e}^t - \frac{k_{c_{max}^e}}{k_{c_{min}}} I_{C'_{min}}\right)}{I_W^0}\right)^{\frac{1}{\gamma_W}}(2^n - 1) \end{cases} \tag{39}$$

Referring to steps 419, 420 and 421, when the error correction luminous intensity value of the maximum color primary is larger than the luminous intensity value $I_{C_{min}}$ of the minimum color primary $C_{min}$, the adjusted second signal of the minimum color primary $C_{min}$ is equal to zero and the adjusted second signal of the maximum color primary $C_{max}^e$ is equal to a maximum value of level of color strength $(2^n-1)$. For the other color primary $C(\neq C_{min}, C_{max}^e)$ (not the minimum color primary and the maximum color primary), we determine whether the error correction luminous intensity value of the other color primary $C(\neq C_{min}, C_{max}^e)$ is larger than the luminous intensity value $I_{C_{min}}$ of the minimum color primary.

If the error correction luminous intensity value of the other color primary $C(\neq C_{min}, C_{max}^e)$ is larger than the luminous intensity value $I_{C_{min}}$ of the minimum color primary, the adjusted second signal of the other color primary $C(\neq C_{min}, C_{max}^e)$ is equal to the maximum value of level of color strength $(2^n-1)$. If the error correction luminous intensity value of the other color primary is not larger than the luminous intensity value $I_{C_{min}}$ of the minimum color primary, the adjusted second signal of the other color primary $C(\neq C_{min}, C_{max}^e)$ is calculated according to the luminous intensity value $I_C^t$ of the other color primary $C(\neq C_{min}, C_{max}^e)$ and the luminous intensity value $I_{C'_{min}}$ of the corresponding minimum color primary $C'_{min}$ in the first set as Equation (39). Then, the adjusted second signal of the dependent color primary is calculated according to the luminous intensity value $I_{C'_{min}}$ of the corresponding minimum color primary $C'_{min}$ in the first set and the luminous intensity value $I_{C_{max}^e}^t$ of the maximum color primary $C_{max}^e$.

Therefore, additional white color is compensated in order to keep a high contrast albeit color washout effect may be introduced. However, it is a trade-off between luminance and chrominance for a color outside the color gamut of the RGBW panel. Since the luminance is more important and both types of panels have probably similar characteristics, the color washout effect may not be significant.

The color matching method of the invention is to consider the characteristics of human visual perception. Since human is more sensitive to the luminous intensity than chrominance, the color matching method of the invention is considered to match the luminous intensity instead. Besides, when the color is outside the gamut, we keep the information of luminance by adding extra white. The color matching method of handling colors outside gamut can provide a higher contrast, which is especially good for displaying a color change with numerous levels, such as sunrise or sunset scenes.

The above color matching method of the invention only mentions a method to match colors from one color space to another. It assumes the color matching is executed from a single full-pixel of the source panel to a single full-pixel of the target panel neglecting the effects of surrounding colors. However, it is not so ideal in many real applications as there are color sub-pixels surrounding. Since the human eyes are less sensible to the resolution of color identification, therefore it is hard to identify a color of a tiny spot excluding the effect generated by surrounding color sub-pixels. Therefore, we can employ several color primaries to generate a color to cheat our eyes. Hence, if we want to match the colors in a better way, we have to consider the spatial distribution of those color primary dots in order to calculate the perceived luminous intensity instead of just using the physical luminous intensity. Therefore, the color matching method of the invention further comprises a pre-process and a post-process in order to counter for the effect of color interactions.

The pre-process is to sample the color from a color pattern of the source panel so as to calculate the color interactions of each color primary regarding the configuration of surrounding color primaries in the first set as shown in the step 402. The post-process is to resample the color to a color pattern of the target panel based on the color interactions among the surrounding color primaries in the second set as shown in the step 422.

Both processes consist of two parts. The first part is the distribution of color dots. Different combinations of color dots trigger different perception. Luminous intensity is proportional to the inverse square law. The second part is the sensitivity of different colors and luminous intensity. Human eyes have a certain range of color blending window. Moreover, the perception of brightness is equal to a logarithmic scale rather than a linear scale. Therefore, different weightings can be applied according to different configurations.

Figure 5:
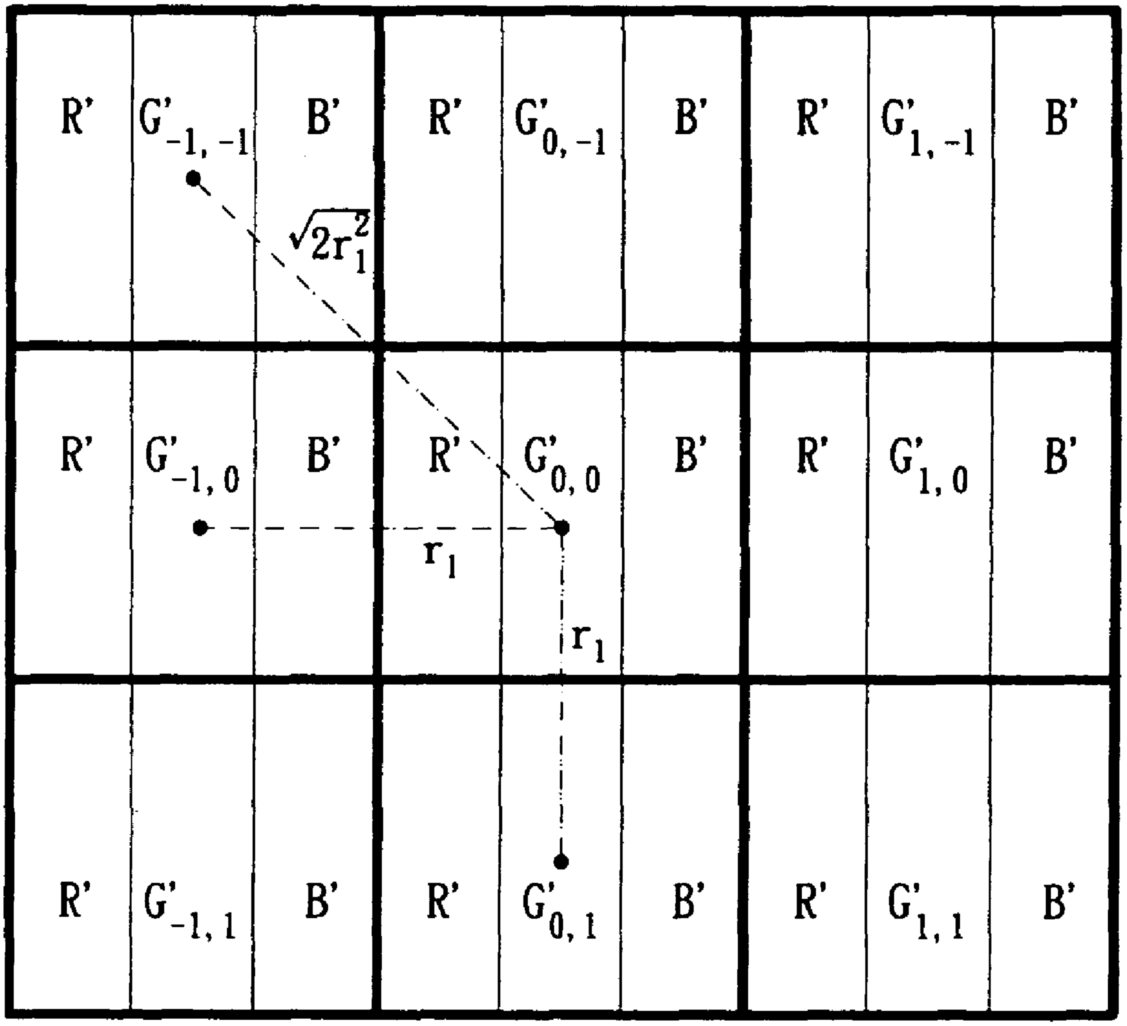
FIG. 5 shows the configuration of the source panel (R'G'B'-stripe).

Referring to FIG. 5, it shows the configuration of the source panel (R'G'B'-stripe). In order to calculate the color interactions of each color primary regarding the configuration of surrounding color primaries in the first set, a first matrix is multiplied to the first signals. The first matrix comprises a plurality of first factors, the first factor is proportional to a value of inverse square distance, and the distance is from a selected color primary to a surrounding color primary.

The selected color primary is $G'_{0,0}$. The distance from the selected color primary $G'_{0,0}$ to the surrounding color primary $G'_{-1,0}$ is $r_1$, and the distance from the selected color primary $G'_{0,0}$ to the surrounding color primary $G'_{0,1}$ is also $r_1$. The distance from the selected color primary $G'_{0,0}$ to the diagonal surrounding color primary $G'_{-1,-1}$ is $\sqrt{2r_1^2}$. We assume $r_1$ is three. According to the inverse square law, the first factor between the selected color primary $G'_{0,0}$ and the surrounding color primary $G'_{-1,0}$ is $1/9$, and the first factor between the selected color primary $G'_{0,0}$ and the surrounding color primary $G'_{0,1}$ is also $1/9$. The first factor between the selected color primary $G'_{0,0}$ and the diagonal surrounding color primary $G'_{-1,-1}$ is $1/18$. Besides, we assume the range of color blending window to be 3×3 full-pixel, that is, both the first column dimension and the first row dimension of the first matrix are three.

Therefore, for considering the spatial distribution of the color primary dots, the modified first signals are calculated according to Equation (40).

$$\overline{N_{0,0}} = \begin{bmatrix} F_{-1,-1} & F_{0,-1} & F_{1,-1} \\ F_{-1,0} & F_{0,0} & F_{1,0} \\ F_{-1,1} & F_{0,1} & F_{1,1} \end{bmatrix} \times \begin{bmatrix} N_{-1,-1} & N_{0,-1} & N_{1,-1} \\ N_{-1,0} & N_{0,0} & N_{1,0} \\ N_{-1,1} & N_{0,1} & N_{1,1} \end{bmatrix} \tag{40}$$

In the embodiment, the factors of first matrix are as follows.

$$\begin{bmatrix} F_{-1,-1} & F_{0,-1} & F_{1,-1} \\ F_{-1,0} & F_{0,0} & F_{1,0} \\ F_{-1,1} & F_{0,1} & F_{1,1} \end{bmatrix} = \begin{bmatrix} \frac{1}{18} & \frac{1}{9} & \frac{1}{18} \\ \frac{1}{9} & 1 & \frac{1}{9} \\ \frac{1}{18} & \frac{1}{9} & \frac{1}{18} \end{bmatrix}$$

For example, the modified first signal $\overline{G'_{0,0}}$ (N=G') of the selected color primary $G'_{0,0}$ can be calculated according to the surrounding color primaries $G'_{-1,-1}$, $G'_{0,-1}$, $G'_{1,-1}$, $G'_{-1,0}$, $G'_{1,0}$, $G'_{-1,1}$, $G'_{0,1}$, $G'_{1,1}$ and the first matrix. For all color primaries of the source panel, the modified first signals can be calculated according to equation (40) so as to calculate the color interactions of each color primary regarding the configuration of surrounding color primaries in the first set.

Figure 6:
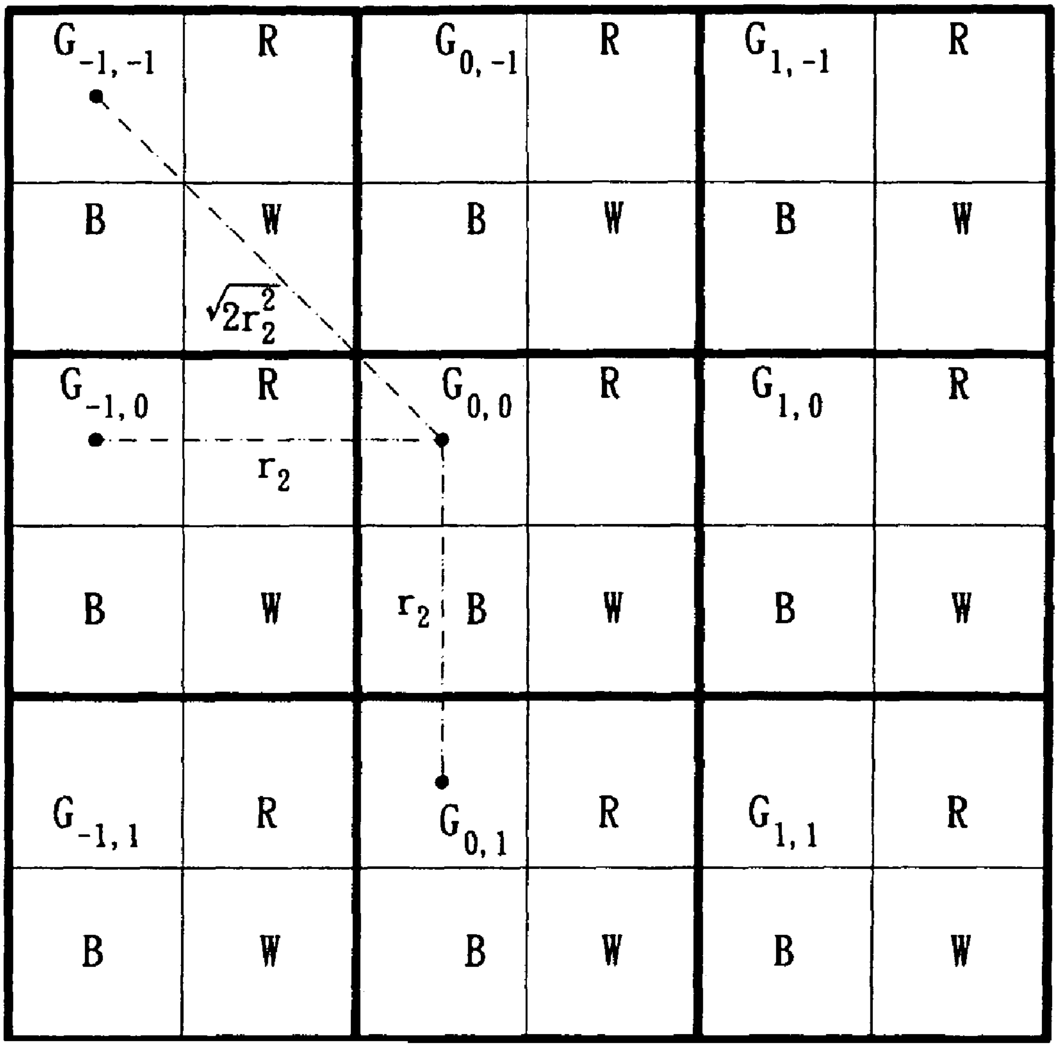
FIG. 6 shows the configuration of the target panel (RGBW).

Referring to FIG. 6, it shows the configuration of the target panel (RGBW). If the pre-process is utilized to sample the color from a color pattern of the source panel as mentioned above, the post-process must be used to resample the color to a color pattern of the target panel after the color matching method is performed. Based on the color interactions among the surrounding color primaries in the second set, a second matrix is used to resample the second signals. The second matrix comprises a plurality of second factors, the second factor is proportional to a value of inverse square distance, and the distance is from a selected color primary to a surrounding color primary.

The selected color primary is $G_{0,0}$. The distance from the selected color primary $G_{0,0}$ to the surrounding color primary $G_{-1,0}$ is $r_2$, and the distance from the selected color primary $G_{0,0}$ to the surrounding color primary $G_{0,0}$ is also $r_2$. The distance from the selected color primary $G_{0,0}$ to the diagonal surrounding color primary $G_{-1,-1}$ is $\sqrt{2r_2^2}$. We assume $r_2$ is two based on the geometry of the RGB and RGBW panels. According to the inverse square law, the second factor between the selected color primary $G_{0,0}$ and the surrounding color primary $G_{-1,0}$ is ¼, and the second factor between the selected color primary $G_{0,0}$ and the surrounding color primary $G_{0,1}$ is also ¼. The second factor between the selected color primary $G_{0,0}$ and the diagonal surrounding color primary $G_{-1,-1}$ is ⅛. Besides, we assume the range of color blending window to be 3×3 full-pixel, that is, both the second column dimension and the second row dimension of the second matrix are three.

Therefore, for re-sampling the color to a color pattern of the target panel, the modified second signals are calculated according to Equation (41).

$$\overline{M} = \begin{bmatrix} S_{-1,-1} & S_{0,-1} & S_{1,-1} \\ S_{-1,0} & S_{0,0} & S_{1,0} \\ S_{-1,1} & S_{0,1} & S_{1,1} \end{bmatrix} \times \begin{bmatrix} M_{-1,-1} & M_{0,-1} & M_{1,-1} \\ M_{-1,0} & M_{0,0} & M_{1,0} \\ M_{-1,1} & M_{0,1} & M_{1,1} \end{bmatrix} \tag{41}$$

In the embodiment, the second factors of the second matrix are as follows.

$$\begin{bmatrix} S_{-1,-1} & S_{0,-1} & S_{1,-1} \\ S_{-1,0} & S_{0,0} & S_{1,0} \\ S_{-1,1} & S_{0,1} & S_{1,1} \end{bmatrix} = \begin{bmatrix} \frac{1}{8} & \frac{1}{4} & \frac{1}{8} \\ \frac{1}{4} & 1 & \frac{1}{4} \\ \frac{1}{8} & \frac{1}{4} & \frac{1}{8} \end{bmatrix}$$

For example, the second signal $\overline{M_{0,0}}$ (M=G) of the selected color primary G is known after the color matching method of the invention, the modified second signal $M_{0,0}$ can be calculated according to Equation (41), wherein the modified second signals $M_{-1,-1}$, $M_{0,-1}$, $M_{1,-1}$, $M_{-1,0}$, $M_{1,0}$, $M_{-1,1}$, $M_{0,1}$, $M_{1,1}$ of the surrounding color primaries are assumed to be the same as the corresponding first signals because of matching the luminous intensity. The above procedure describes the $1^{st}$ order homogenous color interaction. Similarly, higher orders of heterogeneous color interaction can be considered under the same principle.

While embodiments of the present invention has been illustrated and described, various modifications and improvements can be made by those skilled in the art. The embodiment of the present invention is therefore described in an illustrative, but not restrictive, sense. It is intended that the present invention may not be limited to the particular forms as illustrated, and that all modifications, which maintain the spirit and scope of the present invention are within the scope as defined in the appended claims.

What is claimed is:

1. A method for transforming a color representation of a first set of color primaries with a plurality of first signals to a second set of color primaries with a plurality of second signals in a first domain, comprising the steps of:

(a) transforming the first signals in the first domain to corresponding luminous intensity values of the color primaries in the first set in a second domain;

(b) calculating a second signal of a dependent color primary in the second set according to a first function of the first signals;

(c) calculating corresponding luminous intensity values of the color primaries in the second set in the second domain respectively by matching the corresponding luminous intensity values of the corresponding color primaries in the first set in the second domain; and (d) transforming the corresponding luminous intensity values of the other color primaries in the second set in the second domain to the second signals in the first domain, wherein the first set is R'G'B'-stripe, the second set is RGBW pattern, wherein the dependent color primary is W, and the step (b) further comprises the steps of:

(b1) determining a minimum value from the first signals; and (b2) multiplying a first rate to the minimum value so as to calculate the second signal of the dependent color primary W.

2. The method according to claim 1, wherein the dependent color primary is White color primary, and the step (b) further comprises the steps of:

(b1) calculating projected values of the first set of color primaries into the dependent color primary according to the corresponding luminous intensity values of the color primaries in the first set in the second domain; and (b2) determining a minimum value from the projected values.

3. The method according to claim 2, wherein after the step (b2) further comprising a step of: multiplying a first coefficient to the minimum value so as to calculate the second signal of the dependent color primary.

4. The method according to claim 3, wherein the first coefficient is $(\frac{1}{2})^{1/\gamma_w}$, $\gamma_w$ is the corresponding gamma correction factor of the dependent color primary.

5. The method according to claim 4, wherein the step (c) further comprises the steps of:

(c1) calculating the luminous intensity value of the dependent color primary according to the second signal of the dependent color primary in the second set;

(c2) multiplying respectively luma coefficients of the corresponding red, green and blue color primaries to the luminous intensity value of the dependent color primary so as to form corresponding luminous intensity components of the corresponding red, green and blue color primaries in the dependent color primary; and (c3) subtracting the corresponding luminous intensity components from the corresponding luminous intensity values of the corresponding color primaries in the first set in the second domain so as to form the corresponding luminous intensity values of the color primaries in the second set in the second domain.

6. The method according to claim 5, wherein after the step (d) further comprising a step of: determining whether the corresponding luminous intensity values of the color primaries in the second set in the second domain is larger than the corresponding luminous intensity values of fully-switched on color primaries in the second set.

7. The method according to claim 6, wherein when the corresponding luminous intensity values of the color primaries in the second set in the second domain is larger than the corresponding luminous intensity values of fully-switched on color primaries in the second set, further comprising the steps of:

(e1) calculating corresponding extra luminous intensity values of the color primaries in the second set by subtracting the corresponding luminous intensity values of fully-switched on color primaries in the second set from the corresponding luminous intensity values of the corresponding color primaries in the second set;

(e2) calculating corresponding error correction values of the dependent color primary according to the corresponding extra luminous intensity values of the color primaries in the second set;

(e3) determining a minimum color primary and a maximum color primary in the second set respectively according to the minimum value and the corresponding error correction values of the dependent color primary;

(e4) calculating luminous intensity value of the minimum color primary;

(e5) calculating corresponding error correction luminous intensity values of the color primaries in the second set according to the corresponding error correction values of the dependent color primary; and (e6) determining whether each corresponding error correction luminous intensity value of the color primaries in the second set is smaller than or equal to the luminous intensity value of the minimum color primary.

8. The method according to claim 7, wherein when corresponding error correction luminous intensity values of the color primaries in the second set are smaller than or equal to the luminous intensity value of the minimum color primary, further comprising the steps of:

(e71) calculating the second signal of the dependent color primary being equal to a maximum value of the corresponding error correction values of the dependent color primary;

(e81) calculating the luminous intensity value of the dependent color primary according to the second signal of the dependent color primary;

(e91) calculating the second signals of the other color primaries according to the luminous intensity value of the dependent color primary and the corresponding luminous intensity values of the color primaries in the first set.

9. The method according to claim 7, wherein when the error correction luminous intensity value of the maximum color primary is larger than the luminous intensity value of the minimum color primary, further comprising the steps of:

(e72) setting the second signal of the minimum color primary being equal to zero and setting the second signal of the maximum color primary being equal to a maximum value of level of color strength;

(e82) determining whether the error correction luminous intensity value of the other color primary is larger than the luminous intensity value of the minimum color primary;

(e92) setting the second signal of the other color primary being equal to the maximum value of level of color strength, when the error correction luminous intensity value of the other color primary is larger than the luminous intensity value of the minimum color primary;

(e102) calculating the second signal of the other color primary according to the luminous intensity value of the other color primary and the luminous intensity value of the corresponding minimum color primary in the first set, when the error correction luminous intensity value of the other color primary is not larger than the luminous intensity value of the minimum color primary; and (e112) calculating the second signal of the dependent color primary according to the luminous intensity value of the corresponding minimum color primary in the first set and the luminous intensity value of the maximum color primary in the second set.

10. The method according to claim 1, wherein the step (c) further comprises the steps of:

(c1) determining whether the minimum value is larger than a first coefficient;

(c2) setting the second signal of the dependent color primary W to a first constant, and calculating the corresponding luminous intensity values of the other color primaries in the second set in the second domain respectively according to the corresponding luminous intensity values of the corresponding color primaries in the first set and the first constant, when the minimum value is larger than the first coefficient; and (c3) setting one of the second signals of color primaries R, G and B to a second constant, and calculating the corresponding color output luminous intensity values of the other color primaries in the second set in the second domain respectively according to the corresponding color input luminous intensity values of the corresponding color primaries in the first set and the corresponding luminous intensity value of the dependent color primary W in the second domain, when the minimum value is not larger than the first coefficient.

11. The method according to claim 10, wherein the first coefficient is $(3/4)^{1/\gamma}255$.

12. The method according to claim 10, wherein in the step (c2) the corresponding luminous intensity value of color primary R is calculated according to the corresponding luminous intensity value of color primary R', the corresponding luminous intensity value of color primary G is calculated according to the corresponding luminous intensity value of color primary G', the corresponding luminous intensity value of color primary B is calculated according to the corresponding luminous intensity value of color primary B'.

13. The method according to claim 10, wherein in the step (c3) the first signal of color primary R' is the minimum value, the second signal of color primary R is the second constant, the corresponding luminous intensity value of color primary G is calculated according to the corresponding luminous intensity values of color primary G' and the color primary R', the corresponding luminous intensity value of color primary B is calculated according to the corresponding luminous intensity values of color primary B' and the color primary R'.

14. The method according to claim 10, wherein in the step (c3) the first signal of color primary G' is the minimum value, the second signal of color primary G is the second constant, the corresponding luminous intensity value of color primary R is calculated according to the corresponding luminous intensity value of color primary R' and the color primary G', the corresponding luminous intensity value of color primary B is calculated according to the corresponding luminous intensity values of color primary B' and the color primary G'.

15. The method according to claim 10, wherein in the step (c3) the first signal of color primary B' is the minimum value, the second signal of color primary B is the second constant, the corresponding luminous intensity value of color primary R is calculated according to the corresponding luminous intensity value of color primary R' and the color primary B', the corresponding luminous intensity value of color primary G is calculated according to the corresponding luminous intensity values of color primary G' and the color primary B'.

16. The method according to claim 10, wherein the first constant is a maximum value of level of color strength.

17. The method according to claim 10, wherein the second constant is a minimum value of level of color strength.

18. The method according to claim 1, wherein the total luminous intensity value of color primaries in the first set is the same as the total luminous intensity value of color primaries in the second set.

19. The method according to claim 1, wherein the first rate is $(4/3)^{1\gamma}$.

20. The method according to claim 1, wherein before the step (a) further comprising a step of: multiplying a first matrix to the first signals so as to calculate the color interactions of each color primary regarding the configuration of surrounding color primaries in the first set.

21. The method according to claim 20, wherein the first matrix comprises a plurality of first factors, the first factor is proportional to a value of inverse square distance, the distance is from a selected color primary to a surrounding color primary.

22. The method according to claim 21, wherein the first matrix further comprises a first column dimension and a first row dimension, the first column dimension and the first row dimension are the range of color blending window of the surrounding color primaries.

23. A method for transforming a color representation of a first set of color primaries with a plurality of first signals to a second set of color primaries with a plurality of second signals in a first domain, comprising the steps of:

(a) transforming the first signals in the first domain to corresponding luminous intensity values of the color primaries in the first set in a second domain;

(b) calculating a second signal of a dependent color primary in the second set according to a first function of the first signals;

(c) calculating corresponding luminous intensity values of the color primaries in the second set in the second domain respectively by matching the corresponding luminous intensity values of the corresponding color primaries in the first set in the second domain; and (d) transforming the corresponding luminous intensity values of the other color primaries in the second set in the second domain to the second signals in the first domain, wherein before the step (a) further comprising a step of: multiplying a first matrix to the first signals so as to calculate the color interactions of each color primary regarding the configuration of surrounding color primaries in the first set, wherein after the step (d) further comprising a step of: using a second matrix to resample the second signals based on the color interactions among the surrounding color primaries in the second set.

24. The method according to claim 23, wherein the second matrix comprises a plurality of second factors, the second factor is proportional to a value of inverse square distance, the distance is from a selected color primary to a surrounding color primary.

25. The method according to claim 24, wherein the second matrix further comprises a second column dimension and a second row dimension, the second column dimension and the second row dimension are the range of color blending window of the surrounding color primaries.

26. A method for determining a second signal of a dependent color primary of a second set, the second set having a plurality of color primaries with a plurality of second signals in a first domain, the second signals being transformed from a plurality of first signals of color primaries of a first set in the first domain representing a color, comprising the steps of:

transforming the first signals in the first domain to corresponding luminous intensity values of the color primaries in the first set in a second domain;

calculating projected values of the first set of color primaries into the dependent color primary according to the corresponding luminous intensity values of the color primaries in the first set in the second domain;

determining a minimum value from the projected values; and multiplying a first coefficient to the minimum value so as to calculate the second signal of the dependent color primary, wherein the first coefficient is $(1/2)^{1/\gamma_w}$, $\gamma_w$ is corresponding gamma correction factor of the dependent color primary.

27. The method according to claim 26, wherein the first set is R'G'B'-stripe, the second set is RGBW pattern, the dependent color primary is White color primary.

28. A method for calculating adjusted second signals of a second set, after transforming a color representation of a first set of color primaries with a plurality of first signals to the second set of color primaries with a plurality of second signals in a first domain, and the second signals being outside the color gamut of the second set, comprising the steps of:

calculating corresponding extra luminous intensity values of the color primaries in the second set by subtracting corresponding luminous intensity values of fully-switched on color primaries in the second set from corresponding luminous intensity values of the corresponding color primaries in the second set;

calculating corresponding error correction values of a dependent color primary according to the corresponding extra luminous intensity values of the color primaries in the second set;

determining a minimum color primary and a maximum color primary in the second set respectively according to a minimum value and the corresponding error correction values of the dependent color primary;

calculating luminous intensity value of the minimum color primary;

calculating corresponding error correction luminous intensity values of the color primaries in the second set according to the corresponding error correction values of the dependent color primary;

determining whether each corresponding error correction luminous intensity values of the color primaries in the second set is smaller than or equal to the luminous intensity value of the minimum color primary; and calculating the adjusted second signals according to a first algorithm when each corresponding error correction luminous intensity values of the color primaries in the second set is smaller than or equal to the luminous intensity value of the minimum color primary; and calculating the adjusted second signals according to a second algorithm when each corresponding error correction luminous intensity values of the color primaries in the second set is not smaller than or equal to the luminous intensity value of the minimum color primary.

29. The method according to claim 28, wherein when corresponding error correction luminous intensity values of the color primaries in the second set is smaller than or equal to the luminous intensity value of the minimum color primary, the first algorithm comprises the steps of:

(g11) calculating the adjusted second signal of the dependent color primary being equal to a maximum value of the corresponding error correction values of the dependent color primary;

(g12) calculating the luminous intensity value of the dependent color primary according to the adjusted second signal of the dependent color primary;

(g13) calculating the adjusted second signals of the other color primaries according to the luminous intensity value of the dependent color primary and the corresponding luminous intensity values of the color primaries in the first set.

30. The method according to claim 28, wherein when the error correction luminous intensity value of the maximum color primary is larger than the luminous intensity value of the minimum color primary, the second algorithm comprises the steps of:

(g21) setting the adjusted second signal of the minimum color primary being equal to zero and setting the adjusted second signal of the maximum color primary being equal to a maximum value of level of color strength;

(g22) determining whether the error correction luminous intensity value of the other color primary is larger than the luminous intensity value of the minimum color primary;

(g23) setting the adjusted second signal of the other color primary being equal to the maximum value of level of color strength, when the error correction luminous intensity value of the other color primary is larger than the luminous intensity value of the minimum color primary;

(g24) calculating the adjusted second signal of the other color primary according to the luminous intensity value of the other color primary and the luminous intensity value of the corresponding minimum color primary in the first set, when the error correction luminous intensity value of the other color primary is not larger than the luminous intensity value of the minimum color primary; and (g25) calculating the adjusted second signal of the dependent color primary according to the luminous intensity value of the corresponding minimum color primary in the first set and the luminous intensity value of the maximum color primary in the second set.

31. A method for calculating modified second signals based on color interactions among surrounding color primaries in a second set, after transforming a color representation of a first set of color primaries with a plurality of first signals to the second set of color primaries with a plurality of second signals, comprising the steps of:

defining a range of the surrounding color primaries;

calculating a plurality of second factors, each second factor being proportional to a value of inverse square distance, the distance being from a selected color primary to a surrounding color primary;

forming a second matrix comprising the second factors; and calculating the modified second signal of the selected color primary by using the second matrix, wherein the modified second signal of the selected color primary is calculated according to the second matrix, the second signal of the selected color primary and corresponding first signals of the surrounding color primaries.

32. The method according to claim 31, wherein the first set is R'G'B'-stripe, the second set is RGBW pattern.

33. The method according to claim 32, wherein the second matrix further comprises a second column dimension and a second row dimension, the second column dimension and the second row dimension represent the range of the surrounding color primaries.

34. The method according to claim 33, wherein the second matrix is a 3×3 matrix, and the factors of the second matrix are as follows:

$$\begin{bmatrix} \frac{1}{8} & \frac{1}{4} & \frac{1}{8} \\ \frac{1}{4} & 1 & \frac{1}{4} \\ \frac{1}{8} & \frac{1}{4} & \frac{1}{8} \end{bmatrix}.$$

* * * * *